United States Patent [19]

Ohtaki et al.

[11] 4,068,245
[45] Jan. 10, 1978

[54] EXPOSURE CONTROL SYSTEM FOR FLASH PHOTOGRAPHY

[75] Inventors: Shohei Ohtaki, Machida; Zenzo Nakamura, Urawa; Susumu Kozuki, Kawasaki, all of Japan

[73] Assignee: Canon Kabushiki Kaisha, Tokyo, Japan

[21] Appl. No.: 498,618

[22] Filed: Aug. 19, 1974

Related U.S. Application Data

[63] Continuation of Ser. No. 375,033, June 29, 1973, abandoned.

[30] Foreign Application Priority Data

July 3, 1972   Japan .................................. 47-66488
July 17, 1972  Japan .................................. 47-71438

[51] Int. Cl.² .......................... G03B 15/03; G03B 7/16
[52] U.S. Cl. ...................................... 354/149; 354/33; 354/145
[58] Field of Search ................... 354/32, 33, 126, 139, 354/145, 149; 240/1.3

[56] References Cited

U.S. PATENT DOCUMENTS

| | | | |
|---|---|---|---|
| 2,596,376 | 5/1952 | De Goeij | 240/1.3 X |
| 2,682,603 | 6/1954 | Dine et al. | 354/145 X |
| 3,326,107 | 6/1967 | Rentschler | 354/32 |
| 3,374,342 | 3/1968 | Hutchins | 240/1.3 |
| 3,611,895 | 10/1971 | von Albedyll et al. | 354/32 |
| 3,646,865 | 3/1972 | Biber | 354/139 |
| 3,687,028 | 8/1972 | Rentschler | 354/32 |
| 3,705,540 | 12/1972 | Reed et al. | 354/145 X |
| 3,710,701 | 1/1973 | Takishima et al. | 354/145 X |
| 3,738,240 | 6/1973 | Mitani et al. | 354/33 |

*Primary Examiner*—Fred L. Braun
*Attorney, Agent, or Firm*—Toren, McGeady and Stanger

[57] ABSTRACT

A flash exposure control system comprising a flash lighting unit, a battery circuit connected to said flash lighting unit to energize said flash lighting unit during an exposure, a switching arrangement connected to said flash lighting unit to control the termination of energization of said flash lighting unit, a timer for controlling the conduction of said switching arrangement, the timer having an adjustable circuit for adjusting the duration of conducting time as a function of the camera-to-object distance and the adjustable circuit being responsive to the camera focus adjustment, and an aperture adjusting unit responsive to the focus adjustment for defining an exposure aperture.

10 Claims, 15 Drawing Figures

EXPOSURE CONTROL SYSTEM FOR FLASH PHOTOGRAPHY

This is a continuation of Application Ser. No. 375,033 filed June 29, 2973, and now abandoned.

This invention relates to a flash exposure control system, and more particularly it relates to a flash exposure control system capable of providing accurate flash exposure values over a wide range of flash lighting situations ranging from an object at a relatively longer distance to an object at a superclose distance.

In order that the quality of photographs taken with an auxiliary light source such as flash photographic equipment is acceptable, it is well known that by determining the camera-to-object distance L and light energy available from the employed flash unit or the so-called flash guide number $G_{NO}$, photographers generally make use of formula $F = G_{NO}/L$ to compute the camera lens aperture opening F, and then evolve a flash exposure value in conformance therewith. In some cameras and flash units hitherto proposed, the formula is automatically computed by a computing mechanism incorporated in the camera or the flash unit associated with the camera, thereby the area of the camera lens aperture opening is automatically adjusted in response to the focus adjustment of the camera.

Such conventional computing mechanisms adapted for use in flash photography are limited in the ability of automatically evolving flash exposure values as a function of the camera-to-object distance, owing both to the limitations of the camera lens aperture adjustment range and to the limitation of light energy level of the flash unit, so that a narrow object distance range limited thereby makes it difficult to yield the correct exposure for photographic situations which may be encountered at infinite to exceedingly close positions.

In order to make up for such a deficiency, a proposal has been made. According to the proposal, the reflected light from an object illuminated with flash light of the energized flash unit is integrated, and when the integrated intensity of light reaches a predetermined value, the energization of the flash unit is terminated to effect the correct exposure. Such a flash exposure control device is known as the so-called "Computer stroboscope". However, although the proposal has succeeded in the removal of the limitation with regard to the illumination energy, the problem attendant on the limitation of the aperture adjustment range remains unsolved, because the device is designed to control the light energy of the flash unit in conformance with the selected diaphragm value. Thus, similar to the former, it is yet difficult to evolve flash exposure values as a function of the camera-to-object distance over a very wide range.

Particularly when an object to be photographed is situated at a so close distance that an aperture opening smaller than the minimum opening available in the diaphragm control device of the camera is necessary, it is impossible to make the correct exposure. Therefore, in this case, it is usual to modify the alignment of the stroboscopic unit used for illuminating the object with view field of the camera so as to decrease the effective illumination energy level.

So long as such conventional techniques are utilized, however, the photographer must modify a derived exposure value based on his personal experience of high standard, or make a series of bracketed exposure at different exposure values by trial-and-error approach to assure the selection of at least one appropriate exposure value.

Further, in case the stroboscope is used as a flash light source in close range flash mode, as the interval between the optical axis of the camera lens and the stroboscope is decreased being appreciable with respect to the camera-to-object distance, the flash light distribution characteristic of the stroboscope has a stronger effect on the uniformity of illumination for the object. In order to alleviate this disadvantage, O-shaped stroboscopic Xenon tube is employed to be mounted on the front end of the lens barrel. However, the employment of such a type stroboscopic unit is not intended to solve the problems attendant on the derivation of accurate flash exposure values, and, in an extreme case, causes an object being photographed to be illuminated in a ring shape, so that the luminance of the center of the object is decreased as compared with other parts.

The present invention has overcome the above-mentioned conventional drawbacks and disadvantages, and, therefore, it is an object of the invention to provide a flash exposure control system capable of providing accurate flash exposure values over a wide variety of photographic flash light situations including from an object at a relatively longer distance to an object at an extremely close distance.

Another object of the invention is to provide a photographic flash light device adapted for use with the flash exposure control system, which permits the camera coupled therewith to make correct exposure when operating in close and superclose range flash mode.

It is also an object of this invention that the flash exposure control system may take the form of a complex system having extended range capability such that accurate flash exposure values for an object at a usually encountered distance are derived by controlling the guide number or the light energy of a flash equipment with the automatic adjustment of camera lens aperture, while an object at an extremely close distance is illuminated with flash light of an illumination energy level controlled by modifying the alignment of the flash unit, thereby a correct exposure is effected without the necessity of controlling the guide number.

Other objects and advantages of the present invention will be obvious to those skilled in the art from the disclosure hereinbelow.

In the drawings, wherein like reference characters indicate like or corresponding parts;

Figure 6:
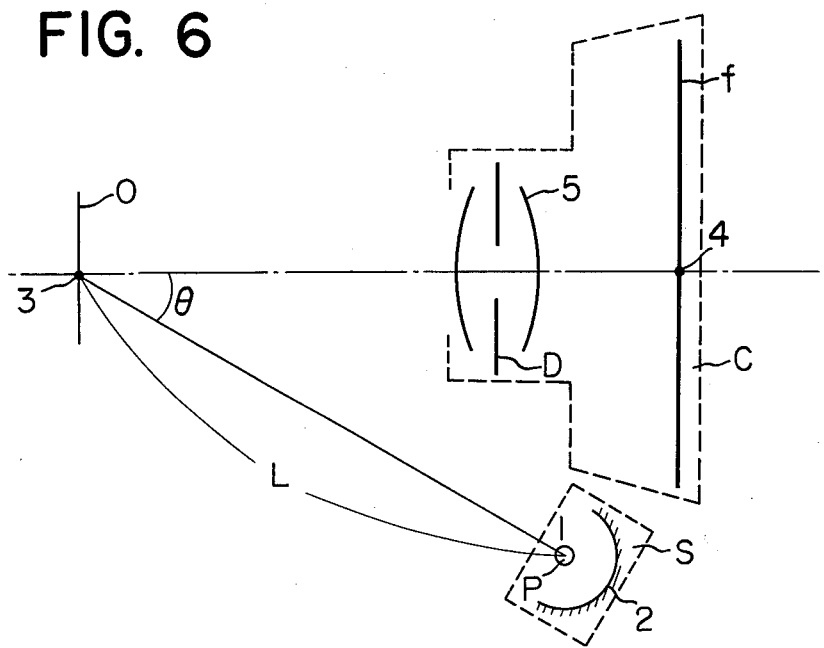
FIG. 6 is a horizontal sectional view illustrating diagramatically the operation of the invention when an object at a superclose distance is photographed in flash mode.

The theoretical background on which the present invention is explained hereinbelow. It is assumed that as shown in FIG. 6, an illumination light source such as a stroboscopic unit S having a discharge tube 1 and parabolic reflector 2 is arranged to shoot toward the center 3 of an object O to be photographed. The light unit is aligned along an angle $\theta$ with respect to the photographic axis of an objective lens 5 having an diaphragm D of a camera C rising a photographic film $f$. The center 4 of the film and the center of the lens are aligned with the center 3 of the object O. The time variable luminance E(o) at the center 3 of the object O in the direction to the objective lens 5 defined by $$E(o) = [RP/L^2]\cos \theta \qquad (1)$$

wherein P is the flash output of light source 1 in terms of Beam Candle Power Second; R is the reflector characteristic of the reflector 2; and L is the distance from the light source 1 to the object center 3. The time variable luminance B(o) at object center 3 in the direction to the camera lens 5 defined by $$B(o) = E(o) \, r/t \qquad (2)$$

(wherein R is the diffuse reflectance of the object O). The luminance I(o) at the film center 4 is defined by $$I(o) = \frac{\pi}{4} \cdot t \cdot B(o) \frac{1}{F^2(1 + M)^2} \qquad (3)$$

(wherein F is the aperture value of the camera lens 5; N is the sensitivity of the film $f$; $t$ is the transmittance of the camera lens 5; and M is the magnification of image)

In general, the formula necessary for evaluation of exposure values is given by the following equation:

$$B \cdot T = K \cdot F^2/N \qquad (4)$$

(wherein R is an exposure time; and K is a constant) In most photographic situations, the left side of equation (4) may be considered to be essentially equal to the time variable luminance of the object exposed to the flash light when photographing in the flash mode. Hence, exposure values for such photographic situations may be evaluated based on the following equation (5) derived from equations (1) - (3):

$$F \cdot L = \frac{1}{M+1} \cdot \sqrt{\frac{N \cdot R \cdot P \cdot r}{t \cdot k} \cos \theta} \qquad (5)$$

In equation (5), the film sensitivity N, constant K, reflector characteristic r are those previously given. However, one of the variables F, L, R, P and $\theta$ should be modified in accordance with image magnification M to derive accurate exposure values.

Equation (5) is particularly relevant to the evaluation of exposure values for an object at a relatively close distance-variations. However, of R, $\theta$ and M may be considered to be negligible, when equation (5) is used to evaluate flash exposure values for an object at a usually encountered distance.

Hence, for the usual focusing distances, equation (5) is reduced to the following equation.

$$F \cdot L = a \sqrt{NP} \qquad (6)$$

(wherein a is constant) The right side of the equation (6) is usually called "guide number", which is often used to compute the camera lens aperture F when photographs are taken using an auxiliary illumination light source.

Figure 7:
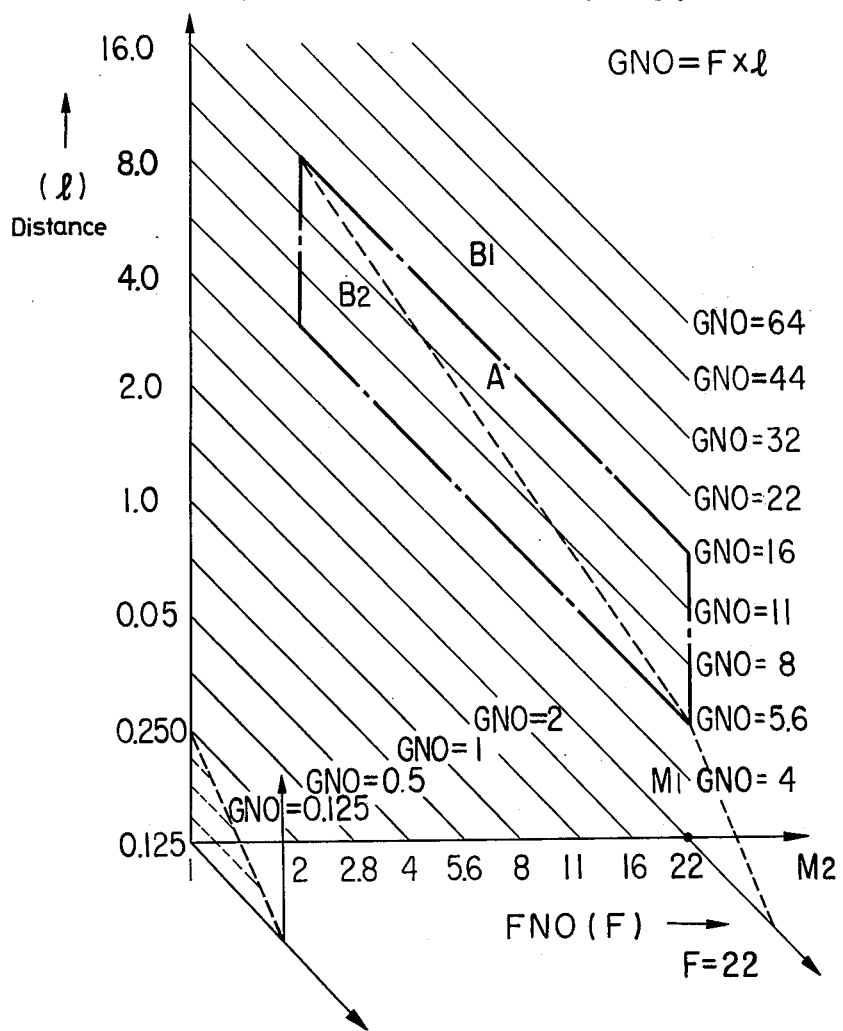
FIG. 7 is a chart having the same indicia as used in FIG. 5, and showing a series of characteristic curves for defining the operation of the flash exposure control system according to the invention.

This relationship is graphically illustrated in FIG. 7. When a stroboscopic unit having a guide number of 16 is used with a camera having a diaphragm control device capable of aperture adjustment between F2 and F22, it is apparent from equation (6) that the curve $B_1$ represents the camera lens aperture opening which may be required at the selected object distance. In other words, it is possible to set the correct exposure for flash lighting situations so long as an object being photographed is posed within a range of distances from a near point of 0.75 meter to a far point of 8 meters. However, when an object at a distance of less than 0.75 meter is photographed, the light energy represented by the guide number 16 is too large to effect the correct exposure.

It is evident from the equation (6) that if the flash energy P is decreased, it is possible to obtain the correct exposure for an object at a distance of less than 0.75 meter. For example, when the guide number is decreased to 5 to 6, the correct exposure is effected for an object at a distance of as short as 0.250 meter as can be seen from the characteristic curve $B_2$ in FIG. 7. Thus the decrease in the guide number of the stroboscopic unit extends the object distance range toward to the shorter positions range, the resulting range being as wide as 0.250 to 8 meters as shown by characteristic curve A in FIG. 7.

However, such a further decrease in the flash energy of the stroboscopic unit which extends the range toward this shorter distance is not valid, because equation (6) was based on the assumption that an object to be photographed is situated in a usual distance L.

In photographing an object at a superclose distance, the image magnification M has a large effect on the evaluation accuracy of exposure values. This as mentioned before, at least one of the variables F, L, R, P and $\theta$ should be corrected on the basis of the value M. Further, a decrease in the light energy of the flash device causes the flash light distribution characteristic of the discharged tube to change. Thus a very difficult problem would be created in the process of achieving a theoretical compensation for the variation of M.

An object of the invention is to impart a continuous or stepwise adjustment of the flash light shooting angle into an exposure control system when performing the superclose flash photography, thereby to yield a correct exposure with high accuracy, while still maintaining constant the flash output level.

The feature of the invention will be explained on the basis of the theoretical equations. When the flash shooting direction deviates by an angle $\theta$ from the alignment with the field of view of the camera, the effective flash output Pe defined by Pe = RPcos $\theta$ is varied with variation of the angle $\theta$. Therefore, equation (5) may be rewritten as $$F \cdot L = \frac{1}{1 + M} \cdot a \cdot \sqrt{N Pe} \qquad (7)$$

It is apparent from equation (7) that to obtain a correct exposure for an object at a superclose distance, one should in practice control the effective flash energy Pe in accordance with distance L and magnification M. This is so, because the valve F cannot be decreased from the minimum aperture value of the camera. So long as the flash energy P is constant, Pe depends on only the flash light distribution characteristics which can be determined experimentally. Thus unstable factors which would arise if the flash energy level is varied are removed. In this case, the angle $\theta$ may be varied either in such manner that when the object distance is decreased from a usual one to superclose one, the angle is discontinuously changed to such a value that the correct exposure is effected only when the object is situated at the superclose distance, for example, at a distance of 0.125 meter, or in such manner that the angle is continuously varied in accordance with the object distance so as to make the correct exposure over the entire range of, for example, from 0.125 meter to 0.250 meter.

Figure 8:
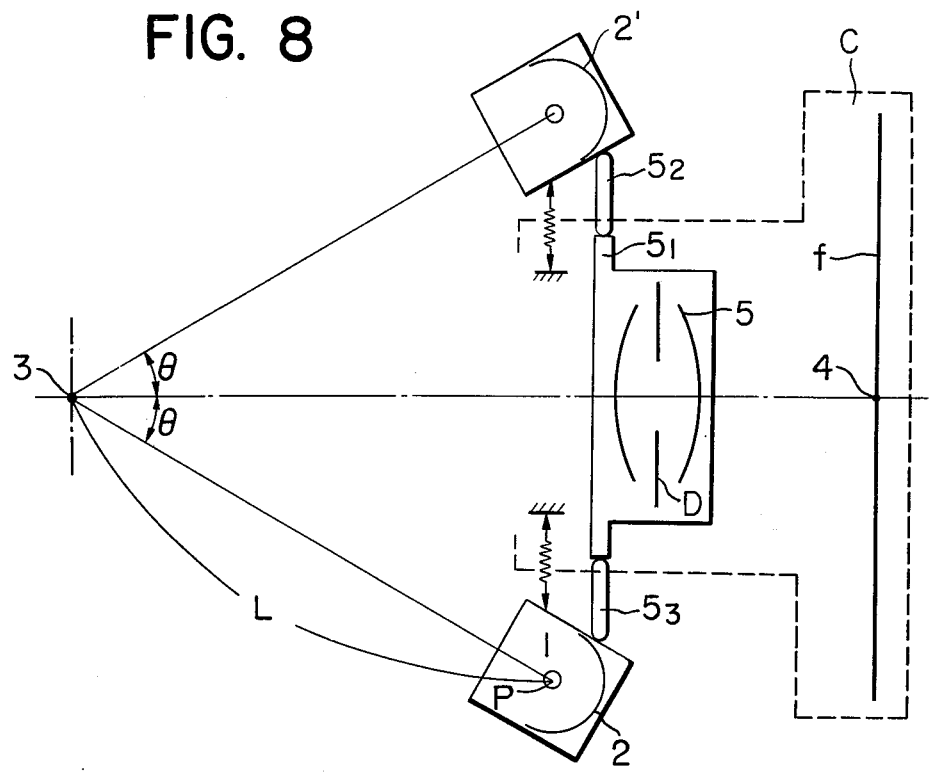
FIG. 8 is a horizontal sectional view illustrating diagramatically the operational feature of the present system shown in FIG. 6 with a modification when an object at a superclose distance is photographed in flash mode.

In connection with the latter, FIG. 8 depicts the operation of the flash exposure control system. Here the distance-adjusting ring of a camera lens barrel 5 is provided with a cam arrangement $5_1$. Two cam followers $5_2$ and $5_3$ slidably engage the cam arrangement 5, to vary the flash light shooting angle $\theta$ of flash units 2 and 2' with respect to the optical axis. As mentioned above, when the flash angle is varied, the flash energy may be kept constant. Thus the right side of equation (7) depends on only the magnification M and constant $a$. For example, suppose that the calculated value of the right side is four, and the flash angle is discontinuously changed to a value at which the discharge tube is directed toward the center of the object at a distance of 0.125 meter. Then, the correct flash exposure is effected only for the superclose object as shown at point $M_1$ in FIG. 7. On the other hand, when the angle is continuously varied with the object distance, the correct exposure is effected for any object so long as it is posed in a range of 0.125 to 0.250 meter as shown by $M_2$ curve in FIG. 7.

As can be understood from FIG. 7, responsive to both the usual distance and a relatively closer or superclose distance, the system of the invention is capable of providing exposure values for continuous variation of the flash lighting situations as shown by a program characteristic A, B, or $B_2$.

Figure 1:
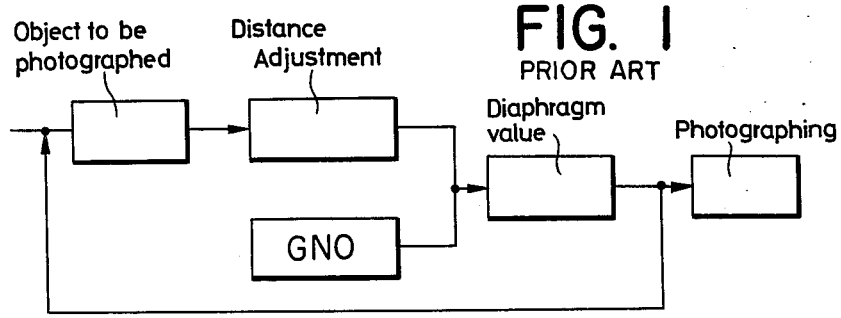
FIG. 1 is a schematic representation of a conventional flash auto system.
Figure 2:
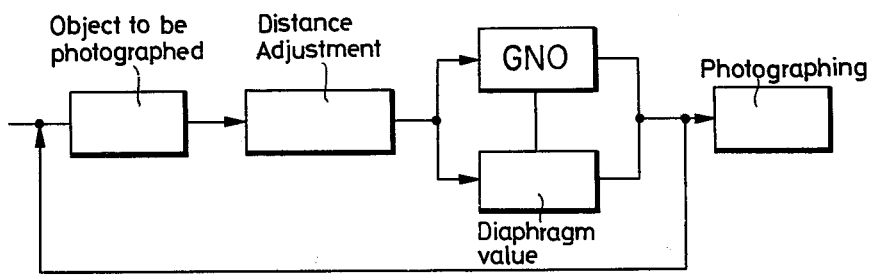
FIG. 2 is a schematic representation of a flash exposure control system according to the present invention.
Figure 4:
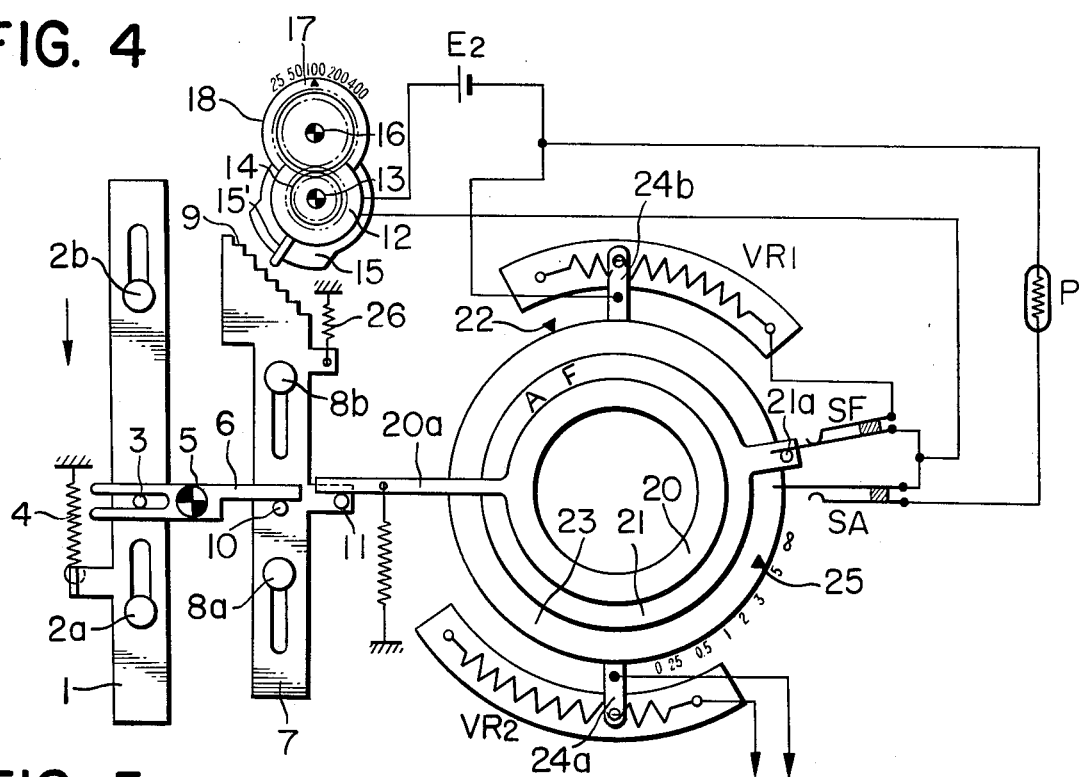
FIG. 4 is a schematic view of the automatic diaphragm control device of the invention.
Figure 5:
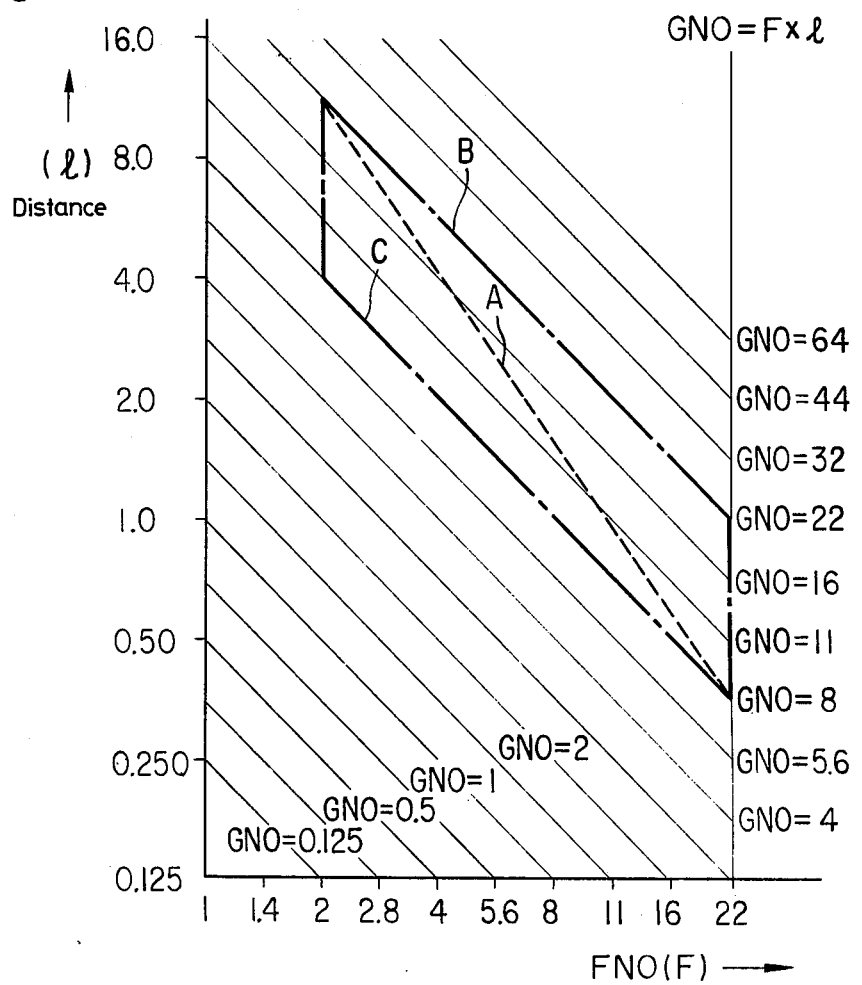
FIG. 5 is a chart depicting a correlation of guide number with lens aperture and object distance.

Preferred embodiments of the invention are explained with reference to the accompanying drawings. FIGS. 2 - 5 illustrate one embodiment of the flash exposure control system capable of evaluating flash lighting situations at usually encountered distances according to the present invention. The outline of the constructional feature of the system of the invention is described herebelow. In prior art systems, aperture adjustment is effected by computing the guide number and determining the camera-to-object distance as shown in FIG. 1. According to the invention, the aperture opening and guide number are simultaneously adjusted to a set of values in comformance with the selected camera-to-object distance. FIG. 5 is a chart correlating the flash guide number with the distance and diaphragm value. In a case where a flash photography is performed using a flash unit having a guide number of 22 and a camera with a F2 lens, inasmuch as the camera lens aperture opening is adjustable in a range of F2-F22, the correct exposure will be made for an object at a distance ranging from one meter to eleven meters, but not for an object at a distance, for example, of 0.5 meter. In order to make the system responsive to the latter distance, the present invention contemplates to vary the guide number in accordance with the distance either in a continuous manner as shown by broken lines C, or in a stepwise manner as shown by chain lines A and B. FIG. 4 illustrates an automatic diaphragm control device associated with a meter 15 constituting an exposure meter circuit including a battery $E_2$ and a photosensor P. An arm 20 a of the diaphragm ring 20 engages with a pin 11 of a pointer-scanning member 7 having cam teeth surfaces 9 and is normally attracted by spring 19 to keep the diaphragm blades not shown in an unblocking position. The reference numeral 1 is a release lever slidably mounted in engagement with guide pins 2a and 2b, and attracted upward by means of a strong spring 4. Numeral 6 is an intervening lever pivotally mounted at a bearing, one arm of which engages the release lever 1 at pin 3, and the other engages the scanning member 7 at pin 10, so that the scanning member 7 is urged by the force of spring 4 against spring 26 to disengagement from the meter needle 15'.

Numeral 21 is a change-over ring for changing over EE photography and flash auto photography to each other which is arranged to operate switches $S_A$ and $S_F$ of the exposure meter circuit by means of a pin 21a mounted on the arm thereof. Numeral 23 is a distance-adjusting ring having brushes mounted on the arm thereof to slide on variable resistors $VR_1$ and $VR_2$.

Numeral 18 is a film sensitivity calibrated disk rotatably mounted at a shaft 16, and a gear 17 fixed on the disk 18 engages a gear 14 fixed on the meter casing so that a rotation of a calibrated disk 18 causes the meter casing to rotate about the shaft 13, thereby the position of meter needle is varied in accordance with the film sensitivity.

When the mark A on the change-over ring is aligned with the symbol mark 22, switch $S_A$ is closed and $S_F$ is open so that the meter needle is made responsive to the intensity of light received by photosensor P to permit the usual EE photography, while when mark F is aligned with symbol mark 22, switch $S_A$ is open and switch $S_F$ is closed, so that the variable resistor $VR_1$ is connected to meter 15 and battery $E_2$. A rotation of distance-adjusting ring 23 for the focus adjustment varies the resistance value of the variable resistor $VR_2$ in accordance with the distance so that the meter needle 15' is deflected to a position in conformance with the selected distance. When release lever 1 is pushed down, the scanning member 7 scans the position of the deflected needle to determine the amount of rotation of the diaphragm ring, as a result of which the area of the aperture opening is automatically adjusted in the same way as in the EE photography.

Figure 3:
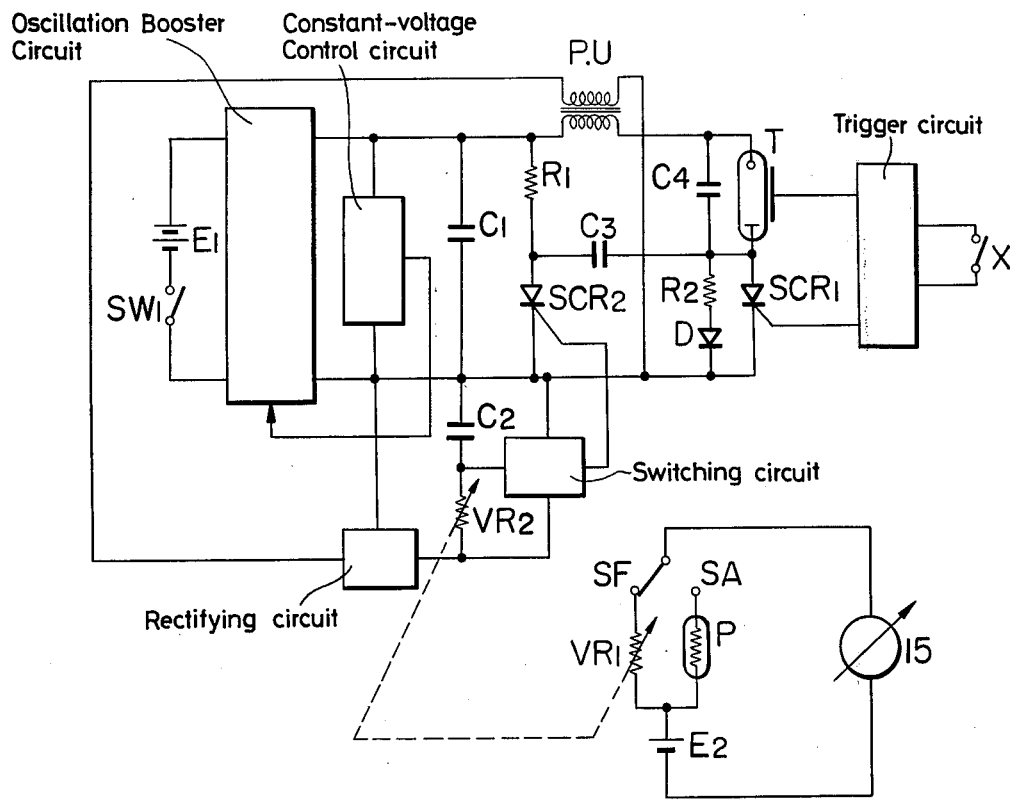
FIG. 3 is a schematic electrical control circuit for governing the operation of the system of the invention.

Simultaneously responsive to the rotation of the distance-adjusting ring 23, the resistance value of the variable resistor $VR_2$ is varied so that the time constant circuit comprising $C_2$ and $VR_2$ shown in FIG. 3 is capable of controlling the guide number in accordance with the distance.

Referring to FIG. 3, a battery $E_1$ for stroboscope is used to charge the main capacitor $C_1$ at a voltage boosted by an oscillation booster circuit. When the shutter is released, the synchronous contact X is closed to transmit a pulse through a trigger circuit to the trigger portion of the stroboscopic discharge tube T and to the gate of $SCR_1$, thereby $SCR_1$ is driven to "on" state, and T is energized. $C_4$ designates an auxiliary capacitor. When a current flows through T, a current generated in the secondary coil of a pick-up transformer PU actuates the time constant circuit $C_2$, $VR_2$ through a rectifier circuit. After a predetermined time has passed, $SCR_2$ is driven to "on", so that $SCR_1$ is reverse biased between the anode and cathode to its not-conducting state, thereby the energization of discharge tube T is terminated. $C_3$ designates a commutation capacitor.

As will be seen from the foregoing description, by uniquely interrelating the automatic aperture adjustment in accordance as a function of camera-to-object distance and the adjustment of the flash light energy level which is effected also in accordance with the camera-to-object distance, the invention provides an easily manageable flash auto device which is responsive to a wide range of flash lighting situations which may be encountered.

FIG. 6 – FIG. 15 illustrate another embodiment of the present invention modified so as to provide a flash exposure control system capable of deriving accurate exposure values for an object at a superclose distance.

Figure 9:
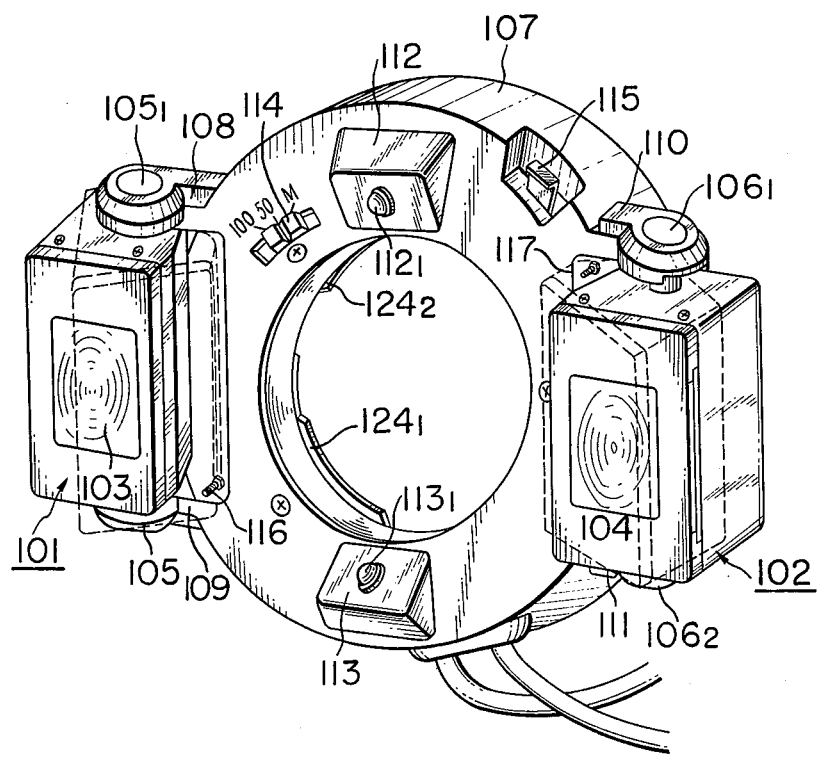
FIG. 9 is a perspective view of a photographic flash light device adapted for use with an photographic device incorporating the system of the present invention capable of superclose photography.
Figure 10:
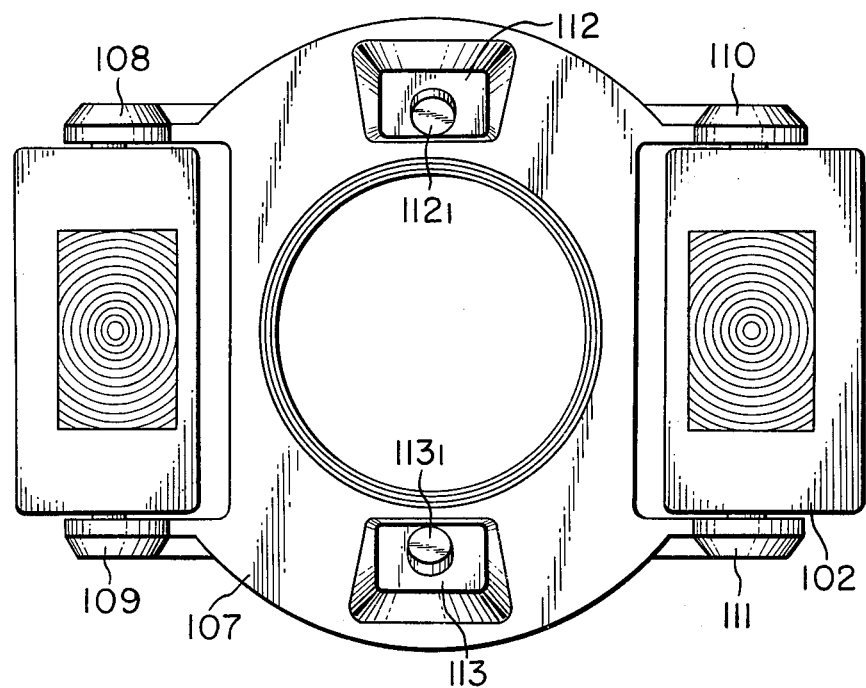
FIG. 10 is a front elevational view of the flash device shown in FIG. 9.
Figure 11:
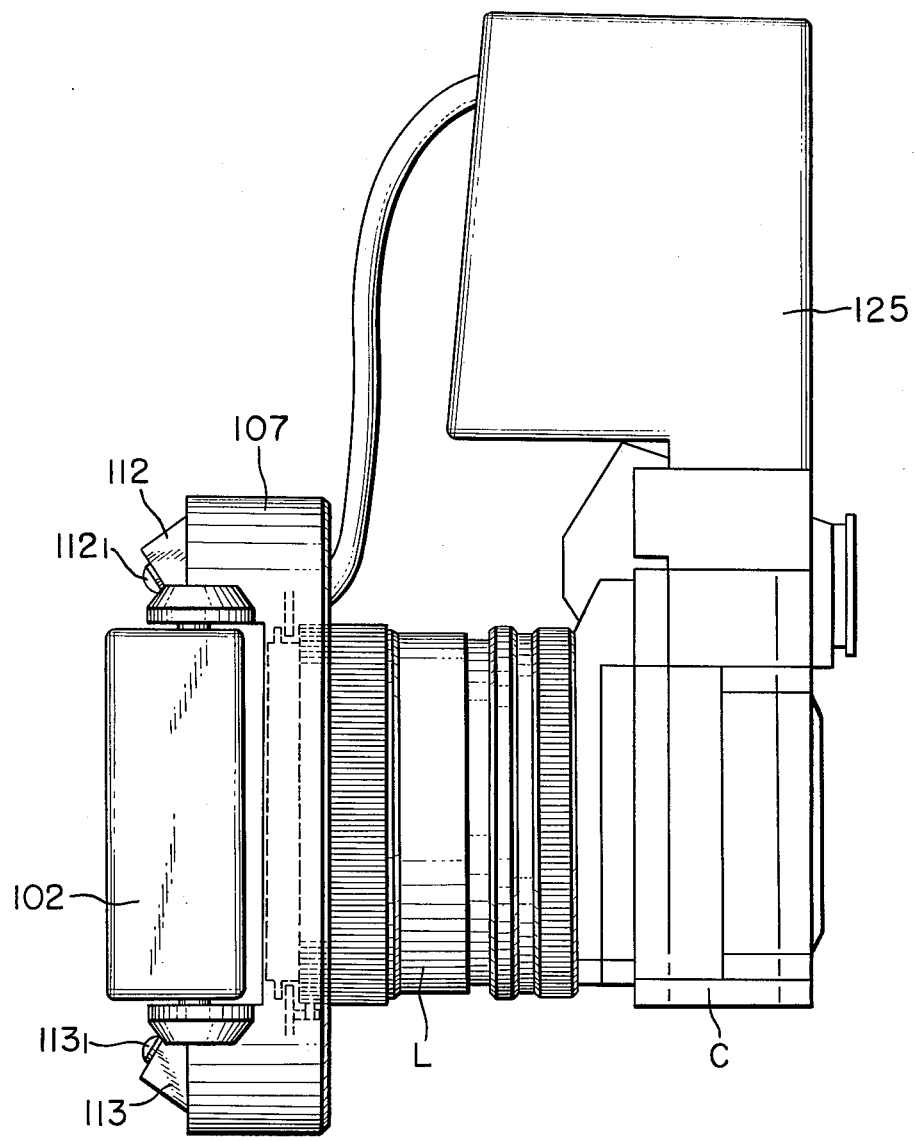
FIG. 11 is a side view of the device shown in FIG. 9 in attachment with a camera lens barrel.

Referring to FIGS. 9 – 11, reference numerals 101 and 102 indicate stroboscopic units having light-permeable filter plates 103 and 104 mounted in their respective flash windows. The stroboscopic units which are pivotable about bearings $105_1$, $105_2$, $106_1$ and $106_2$ are carried on fork-like arms 108, 109, 110 and 111 projecting from a cap 107 that is attachable to a camera lens barrel. The cap 107 is further provided with illumination light source housings 112 and 113 having condenser lenses 112, and 113, mounted on upper and lower portions of the front surface of cap 107 respectively. These are used to illuminate the center of an object when operating the focus adjustment for an object at a superclose distance so that the distance adjustment operation of the photographic lens is easily carried out. A selector switch or change-over means 114 provides three selection positions according to the focal lengths of the camera lens f=50mm and f=100mm and manual operation M. A lock-releasing member 115 is used for detaching the cap 107 from the lens barrel. Switching or change-over pins 116 and 117 switch over microswitches to be described hereafter and are arranged to be pressed by portions of the stroboscopic units when the stroboscopic units are pivoted to positions indicated by broken lines in FIG. 9 to change the flash angle. FIG. 11 illustrates an attachment of the cap 107 carrying the stroboscopic units shown in FIG. 9 and FIG. 10 to the lens barrel of camera C.

Figure 12:
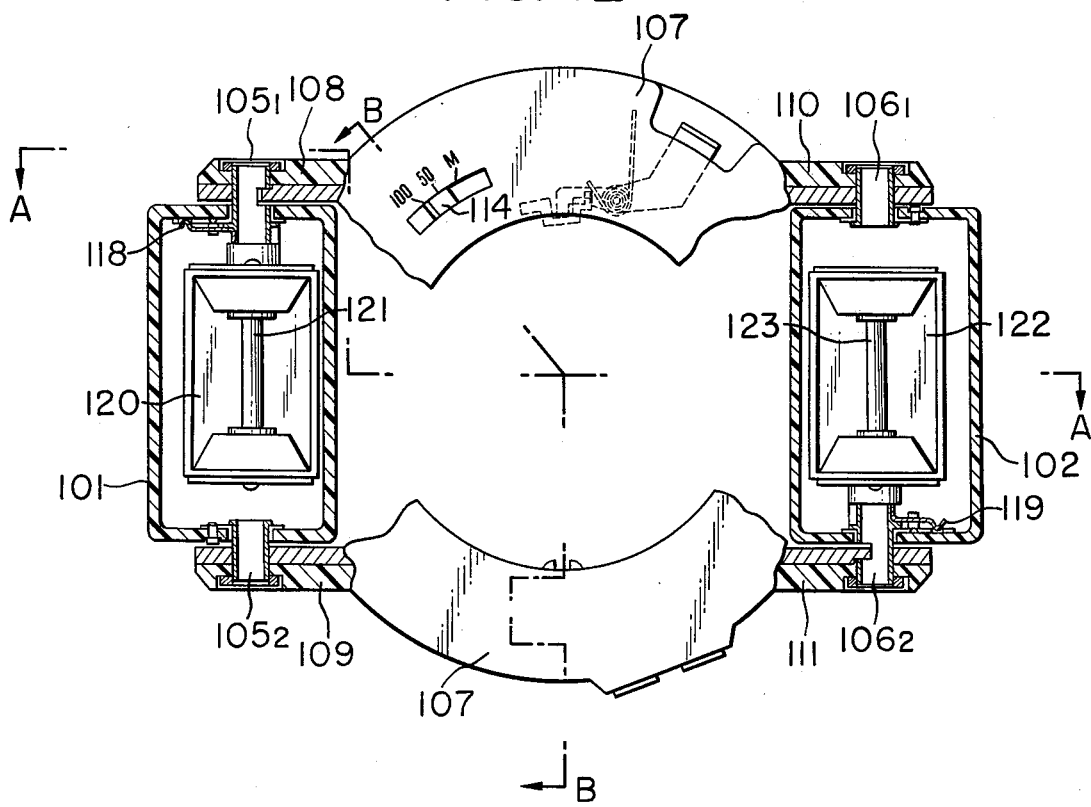
FIG. 12 is a front elevational view of the device shown in FIG. 9, partially in section.

Referring to FIG. 12, the stroboscopic unit 101 or 102 is pivotally supported between bearings $105_1$ and $105_2$, or $106_1$ and $106_2$ respectively. The pivotable movement is controlled by means of rebound clip arm 118 or 119 mounted on shaft $105_1$ or $106_2$ to secure the stroboscopic unit at the position indicated by the broken lines shown in FIG. 9. In FIG. 12, the stroboscopic units 101 and 102 are illustrated as having xenon tubes 121 and 123 fixed at the center of the reflectors 120 and 122 respectively.

Figure 13:
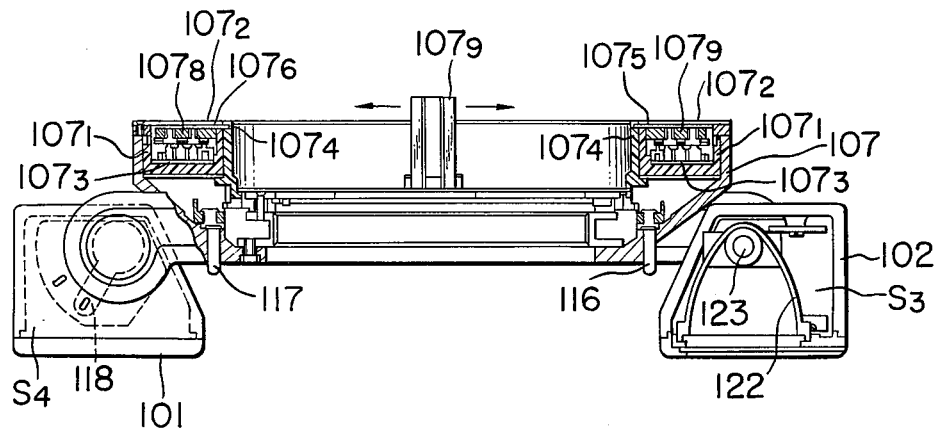
FIG. 13 is a top plain view of the device shown in FIG. 9, partially in section.

Referring to FIG. 13, a plastic ring $107_1$ having a rectangular channel broached therein is rigidly mounted inside the cap 107. A board cover plate $107_2$ is fixed on the ring $107_1$ to make a space with the channel in which a ring resistor $107_3$ is mounted. Coaxially and movably secured in the ring $107_1$ is a sleeve $107_4$ which is connected to sliders $107_7$ and $107_8$ through connection rods $107_5$ and $107_6$, so that a rotation of sleeve $107_4$ permits the sliders $107_7$ and $107_8$ to slide on the resistor $107_3$, thereby to provide two rheostats. Rigidly mounted on sleeve $107_4$ is an engaging member $107_9$ having a channel-like key receiver in such an arrangement that when the cap 107 is attached to the lens barrel as shown in FIG. 14, a pin $l_1$ mounted on the distance-adjusting ring of the lens barrel is urged to engagement with the key receiver by insertion thereto.

Figure 14:
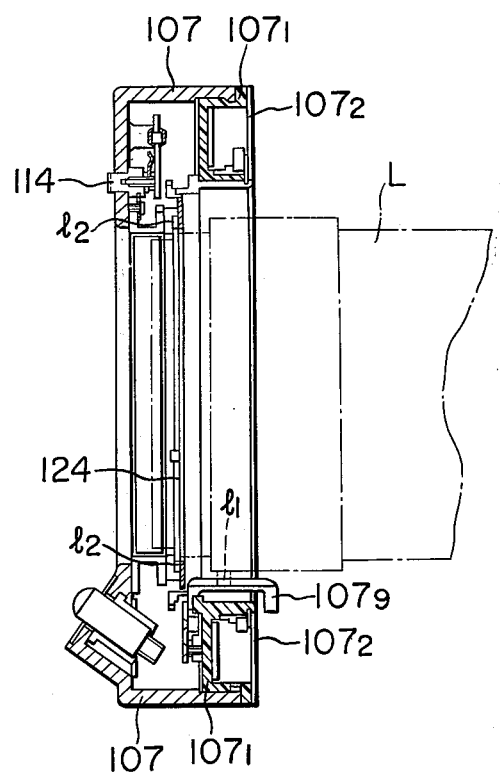
FIG. 14 is a vertical section taken along the line B-B' in FIG. 10.

Referring to FIG. 14, the cap 107 is provided with a bayonet receiver 124 mounted rigidly therein which when engaged with a bayonet $l_2$ secured on the front end portion of lens barrel L permits the cap to be secured on the front end of lens barrel L, while the engaging member $107_9$ is engaged with the distance adjusting ring pin $l_1$ on the lens barrel.

In order to make the above-mentioned construction ready for flash photography, an operator attaches the cap on the front end portion of the lens barrel of a camera C, while engaging respectively the key receiver of engaging member $107_9$ and bayonet receiver 124 with the pin $l_1$ and bayonet $l_2$, and rigidly secures the cap 107 on the front end of the camera lens barrel L as shown in FIG. 11. Here numeral 125 indicates an electric circuit control unit for the stroboscopic units 101 end 102, and character H indicates a flash coupler.

Figure 15:
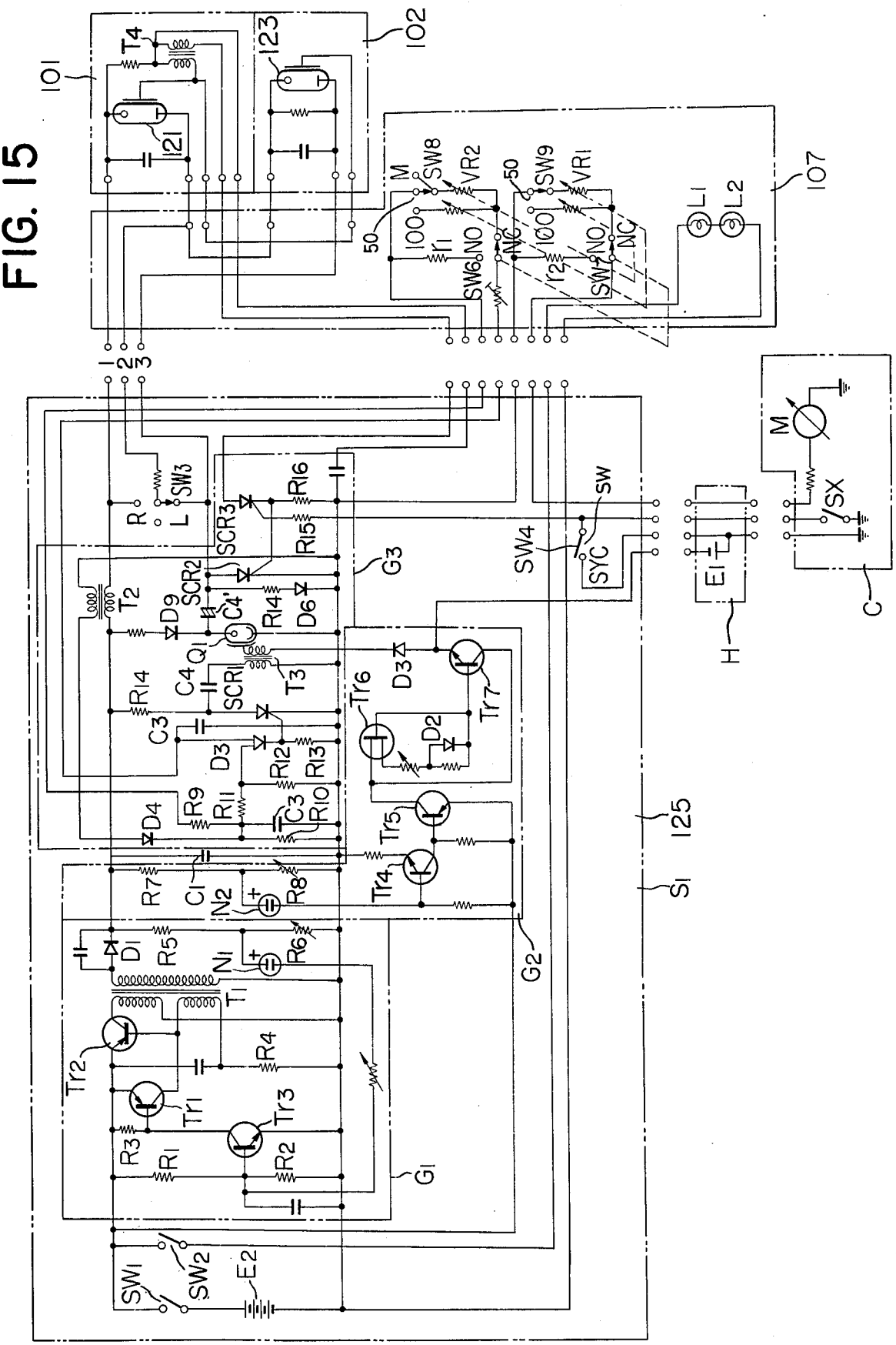
FIG. 15 is a circuit diagram including the circuits of the device shown in FIG. 9 and the exposure mechanism of the camera.

Referring to FIG. 15, a connection diagram is illustrated as including the electric circuits incorporated in the stroboscopic units 101 and 102, the ring channel of cap 107 and the control unit 125. The circuit of control unit 125 comprises a direct-current voltage booster circuit $C_1$, a constant voltage $G_2$ and a flash output control circuit $G_3$. The booster circuit $G_1$ which is of the known type is so constructed that the output of the booster transformer OSCT after rectified by diode D is directed to the main capacitor C1 of which the terminal voltage is divided by a bleeder resistor $R_5$ and $R_4$, and is detected by a Neon tube $N_1$ to control the termination of the oscillation through a control transistor $Tr_3$. At the same time, the voltage across the main capacitor C1 is divided by another bleeder resistance R7, R6 and detected by another Neon tube N2, so that when the voltage of the main condenser has reached a predetermined value, the Neon tube N2 is allowed to discharge, and this causes transistor Tr7 to conduct with the result that a constant voltage output is formed which is applied through a flash coupler H to the exposure control circuit of the camera. The control circuit $G_3$ comprises a flash current detecting transformer T2, a diode D4, a capacitor C2, a program conjunction transistor D5, a condenser C3 for time constant, a trigger $SCR_1$, a trigger transformer $T_3$, a quenching tube $Q_1$, triggers $SCR_2$ and $SCR_3$. The two Xenon tubes 121 and 123 of stroboscopic units 101 and 102 are connected to each other in series, and connected through $SCR_2$ to the main capacitor $C_1$ for energization of the flash units. The connection of the Xenon tubes, and moreover the duration of flash light time is extended, as disclosed in our copending Japanese Pat. applications Nos. 47-24497 and 47-24498.

The two rheostats $VR_1$ and $VR_2$ comprising the resistor and sliders in cap 107 are changed over by means of the changeover means 114 interlocking with switches $SW_8$ and $SW_9$. The rheostat $VR_1$ is connected to the diaphragm indicator M incorporated in the exposure meter circuit of the camera C, while the other rheostat $VR_2$ is connected to condenser $C_2$ of control circuit $G_3$. Switch $SW_6$ and $SW_7$ in cap 107 are changed over by means of change-over pins 116 and 117. The switches are set to contacts NC when an object at a usual distance is photographed. They are switched to contacts NO by means of pins 116, 117 which are pressed upon the pivoting of the stroboscopic units 101 and 102, to the positions indicated by the broken lines, when an object at a superclose distance is photographed. In the former case, at usual distances the diaphragm value indicated in the indicator as well as the light energy available from the Xenon tubes of the stroboscopic units is varied in accordance with the object distance. On the other hand, in the latter case at superclose distances, both the exposure meter circuit and flash energy control circuit for the Xenon tubes are made irresponsive to the focus adjustment. The output of the secondary coil of detection transformer $T_2$ is applied through a diode $D_4$ to a smoothing condenser $C_2$. Applied on the timing condenser $C_3$ is a direct current voltage of almost constant level through the resistor $R_9$ and the resistor $VR_2$ or $r_1$. The conjunction transistor $D_5$ permits the condenser $C_2$ to be instantaneously charged at the starting point of flash current. After an interval of time dependent on the time constant based on the resistance of $VR_1$ or $r_1$ and the capacity of capacitor $C_3$, the completion of charging capacitor $C_3$ causes it to conduct, as a result of which the voltage generated in resistor $R_{13}$ makes $SCR_1$ conductive to leak away the charge on condenser $C_4$ through transformer $T_3$, trigger the quenching tube $Q_1$ and leak away the residual charge on the main capacitor, terminating the energization of the Xenon tube 121 and 123.

Therefore, the duration of energization of the Xenon tubes is controlled in accordance with the object distance, when they are connected to $VR_2$, while when the object at an extremely close distance is photographed, the duration of energization dependent on the value of resistance $r_1$, is kept constant. The transistors $Tr_3$ and $Tr_4$ are switching transistors and are made conductive by the discharge of Neon tube $N_2$. When transistor $Tr_5$ is "on", a constant current flows between the gate and drain of transistor $Tr_6$ and applied to the base of transistor $Tr_7$. As a result, the transistor $Tr_7$ is made conductive and a forward current flows through diode $D_3$ to form a constant voltage output at the anode terminal of the diode. The constant voltage output is forwardly directed to the battery $E_1$ of the flash coupler H.

As a result, the meter M of the exposure meter circuit and E1-M-VR1, or $r_2$-$D_3$-$E_1$ form a closed circuit. Moreover, the meter M is responsive to the resistance of resistor VR1 or r1, because the diode $D_3$ is biased forward. On the other hand, the voltage generated across the diode $D_3$ is applied through a synchronous switch Sx to the gate of $SCR_6$ as a trigger voltage, and to the trigger transformer as a trigger current. The switch $SW_3$ is used to change the number of discharges. When it is connected to either R or L, one of the Xenon tubes 101 and 102 is energized, while when connected to BOTL, the both Xenon tubes are simultaneously energized. L1 and L2 designate illumination lamps incorporated in the illumination housings 112 and 113. When resistor r1, or r2 is selected, the quantity of light energy of the Xenon tube is decreased to four in terms of guide number.

Next, the operation of the circuits shown in FIG. 15 will be explained hereinbelow. When the control unit 125 is connected to a camera C through the flash coupler H, a wiring among the circuits of the control unit 125, the flash coupler H and the camera C is established, and the control unit 125 is connected to stroboscopic units through a cable, so that the total circuits are made operative thereby.

When the main switch Sw is closed, the booster oscillation voltage circuit G1 is connected to the battery E2, and the boosted voltage is applied to the main capacitor C1. When the voltage of the capacitor C1 reaches a predetermined voltage level, a voltage generated in the constant voltage circuit is applied to the meter circuit of the camera C through H, so that the meter is made operative. In this state, when an object being photographed is situated at a usual distance, switches $SW_6$ and $SW_7$ are connected to contact NC, so that $VR_1$, $VR_2$ are adjusted in conformation with the selected object distance. The selected $VR_1$ value determines the flash output P according to program A shown in FIG. 7. Next, when the release mechanism of a camera not shown is actuated, the synchronous contact is closed, so that the energization of the Xenon tubes is started by the flash output control circuit G3, and the flash output P is controlled by the flash output control circuit G2 in conformation with the selected $VR_2$ value.

When the stroboscopic unit is aligned with an object at a superclose distance, switches $SW_6$ and $SW_7$ are automatically changed over from NC to NO contacts so that the $VR_1$ and $VR_2$ are replaced by fixed resistors r1 and r2, thereby the diaphragm value F and flash output P is maintained constant. In order to effect uniform illumination for the object, the flash light portions S2 and S3 shown in FIGS. 7, 9 and 10 are inclined at an angle $\theta$ with respect to the optical axis.

When switches SW is closed, the illumination lamps L1 and L2 illuminate the object so that the focus adjustment is easily carried out.

The flash lighting portions S2 and S3 of the stroboscopic units 101 and 102 are arranged in parallel with the photographic axis, when an object at usual or relatively close distance is photographed.

When the object distance falls in the superclose distance range which may be indicated by means of a meter of a camera, the flash lighting portions S2 and S3 are inclined through an angle $\theta$ to the photographic axis so that the switches $SW_6$ and $SW_7$ are changed over to replace $VR_1$ and $VR_2$ with r1 and r2, thereby the diaphragm value T and the flash light energy P are irresponsive to the focus adjustment, thus remaining constant.

The values of flash angle and flash output may be varied with the variation in the object distance, or in the alternative they may be fixed at such values that exposure errors are minimized. The embodiments of the invention employs the latter case, but experimental results show that exposure errors are negligible.

Further the embodiments are illustrated as including two stroboscopic units, but the embodiment may be modified as including only one stroboscopic unit. Even in this case, a similar evaluation of flash exposure values may be made.

As will be seen from the foregoing description, the present invention provides the exposure control system capable of deriving both exposure values for photographic situations which may be encountered at usual distances and flash exposure values for flash lighting situations at a superclose distance range with very high accuracy and in foolproof, thereby to provide additional advantages to wide applications of flash lighting equipments such as stroboscopic units to flash photography, because the number of flash lighting photographic situations is increased along the extended range of the object distance. In the aforementioned embodiments, the devices which extend the range over which the camera is capable of utilizing light from the flash when the camera is focused on close objects, may be referred to as range extending means. The structure which simultaneously applies inputs corresponding to the position of the focusing arrangement into the aperture control and the circuit that energizes the flash, may be referred to as entering means.

What is claimed is:

1. A flash exposure control system for use with a photographic camera comprising:
   flash lighting means;
   circuit means connected electrically to said flash lighting means to energize said flash lighting means;
   angle changing means engageable with said flash lighting means to change the flash angle of said flash lighting means on the basis of distance to an object, said changing means being operative for changing the flash angle of said flash lighting means over a first set of angles corresponding to distances from the object greater than a given distance, said changing means being operative for changing the flash angle of said flash lighting means over a second set of angles corresponding to distances less than the given distance; light energy control means coupled to said flash lighting means and coupleable with said angle changing means for controlling the light energy level of the flash lighting means in a first range when the flash angle varies within the first set of angles, said light energy controlling means being operative for controlling the level of the light energy in a second range when the flash angle varies within the second set of angles, the light energy level in the first range being dependent upon the flash angle, the light energy level in the second range being less dependent on the flash angle than in the first range.

2. The flash exposure control system of claim 1, wherein said light energy control means when coupled with said angle changing means controls the light energy level of the flash lighting means in conformance with the flash exposure value based on the formula defined by $$F \cdot L = (1/M+1) \cdot a \cdot \sqrt{N} \, Pe$$

wherein Pe is the effective flash light energy; L is the camera-to-object distance; M is the magnification of image; F is the diaphragm value; and N is the film sensitivity.

3. The flash exposure control system of claim 1, wherein said light energy control means is provided with a light energy control branch circuit which is made operative in response to the flash angle being within the first set of angles, said branch circuit comprising:
   switching means connected to said flash lighting means for controlling the termination of energization of flash lighting means; and
   timing means for controlling the conduction of said switching means, said timing means having adjustable circuit means for adjusting the interval of conducting time dependent on the camera focus adjustment.

4. The flash exposure control system of claim 1, wherein the light energy control means controls the light energy level of the lighting means at near distance-range shooting in conformance with the flash exposure value based on the formula defined by $$F \cdot L = (1/M+1) \cdot a \cdot \sqrt{NPe}$$

wherein Pe is the effective flash light energy; L is the camera-to-object distance; M is the magnification of image; F is the diaphragm value; and N is the film sensitivity.

5. The flash exposure control system of claim 1, wherein the lighting means include a pair of electric flashing tubes, and the angle changing means comprise a pair of bracket means for holding pivotably each of the lighting means for adjusting the flashing angle of the flashing tube swingable toward the object.

6. A flash device for use with a camera having an objective with a distance adjusting component as well as a diaphragm regulating mechanism having impedance means coupled with the distance adjusting component: comprising a flash unit including support means for rigidly securing the unit to the camera and illuminating means rotatably mounted on said support means, said illuminating means including angular position setting means for varying the direction of illumination with respect to the optical axis of the objective, control circuit means connected to said illuminating means and mounted on said support means, said control circuit means including a timing circuit for controlling the time of energization of said illuminating means and having an impedance means for varying the energization time, said impedance means of said timing circuit when said flash unit is secured to the camera being coupled to the distance adjusting component to vary the energization time, a flash lighting source electrically connected to said flash unit and having a power source and a control circuit connected to the output of said power source, said control circuit including a switching circuit connected between said illuminating means and said power source and a control signal forming circuit, said control signal forming circuit being connected to said impedance means of said timing circuit and to said switching circuit to apply a light control signal to said switching circuit corresponding to the selected distance.

7. A flash device as in claim 6, wherein said flash unit includes means for linking said illuminating means to said distance adjusting component for deflecting said illuminating means.

8. A flash device as in claim 6, wherein said support means is shaped in the form of a ring and said illuminating means are mounted on the periphery thereof.

9. A flash device as in claim 6, wherein said support means include a right and left side and said illuminating means comprises a pair of illuminating portions mounted on the right and left side of said support means and tiltable so that the lighting directions of the illuminating means are variable independent of each other.

10. A flask device for use with a camera having an objective with a distance adjusting component as well as a diaphragm regulating mechanism having impedance means coupled with the distance adjusting component: comprising a flash unit including support means for rigidly securing the unit to the camera and illuminating means rotatably mounted on said support, means, said illuminating means including angular position setting means for varying the direction of illumination with respect to the optical axis of the objective, control circuit means connected to said illuminating means and mounted on said support means, said control circuit means including a timing circuit for controlling the time of energization of said illuminating means and having an impedance means for varying the energization time, said impedance means of said timing circuit when said flash unit is secured to the camera being coupled to the distance adjusting component to vary the energization time, a flash lighting source electrically connected to said flash unit and having a power source and a control circuit including a switching circuit connected between said illuminating means and said power source and a control signal forming circuit, said control signal forming circuit being connected to said impedance means of said timing circuit and to said switching circuit to apply a light control signal to said switching circuit corresponding to the selected distance said control circuit comprising;

adjusting means associated with the illuminating means and operatively connected to the impedance means so as to adjust the timing circuit to the shortest timing operation when the illuminating means is rotated.

* * * * *